(12) United States Patent
Chandy

(10) Patent No.: US 8,903,610 B2
(45) Date of Patent: Dec. 2, 2014

(54) SYSTEM FOR PROVIDING ASSIST TORQUE BASED ON A VEHICLE STATE

(71) Applicant: Ashok Chandy, Fenton, MI (US)

(72) Inventor: Ashok Chandy, Fenton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/795,303

(22) Filed: Mar. 12, 2013

(65) Prior Publication Data

US 2014/0277945 A1    Sep. 18, 2014

(51) Int. Cl.
*B62D 6/00*    (2006.01)
*G06D 1/00*    (2006.01)

(52) U.S. Cl.
CPC ........................................ *B62D 6/00* (2013.01)
USPC .......................................................... 701/42

(58) Field of Classification Search
USPC .......................................................... 701/42
See application file for complete search history.

(56) References Cited

U.S. PATENT DOCUMENTS

| | | | |
|---|---|---|---|
| 6,212,453 B1 * | 4/2001 | Kawagoe et al. | 701/41 |
| 6,256,561 B1 * | 7/2001 | Asanuma | 701/41 |
| 6,778,890 B2 * | 8/2004 | Shimakage et al. | 701/41 |
| 8,150,581 B2 * | 4/2012 | Iwazaki et al. | 701/42 |
| 8,452,492 B2 * | 5/2013 | Buerkle et al. | 701/41 |
| 2004/0204808 A1 | 10/2004 | Satoh et al. | |
| 2007/0021889 A1 | 1/2007 | Tsuchiya | |
| 2009/0024278 A1 * | 1/2009 | Kondo et al. | 701/41 |
| 2010/0228438 A1 | 9/2010 | Buerkle | |
| 2012/0197496 A1 * | 8/2012 | Limpibunterng et al. | 701/42 |

FOREIGN PATENT DOCUMENTS

| | | |
|---|---|---|
| EP | 2489577 A2 | 8/2012 |
| WO | 2010082394 A1 | 7/2010 |

OTHER PUBLICATIONS

Partial European Search Report for related European Patent Application No. 14156903.8, dated: Sep. 23, 2014, 6 pages.

* cited by examiner

*Primary Examiner* — Mary Cheung
*Assistant Examiner* — Anne Mazzara
(74) *Attorney, Agent, or Firm* — Cantor Colburn LLP

(57) ABSTRACT

A control system for providing an assist torque is provided. The control system includes a control algorithm module and a comfort limit module. The control algorithm module calculates a corrective steering torque based on a target vehicle state and an estimated vehicle state. The comfort limit module receives a handwheel torque. The comfort limit module calculates a limited corrective steering torque based on the corrective steering torque and the handwheel torque. The limited steering torque represents an allowable amount of the assist torque provided by the control system.

20 Claims, 6 Drawing Sheets

SYSTEM FOR PROVIDING ASSIST TORQUE BASED ON A VEHICLE STATE

FIELD OF THE INVENTION

The present invention relates to a system for providing an assist torque and in particular to a system for providing the assist torque that is based on a target vehicle state and an estimated vehicle state.

BACKGROUND OF THE INVENTION

A number of approaches are available to assist a vehicle in maintaining a central position within a driving lane. One such approach is generally referred to as a lane keeping system that includes a camera for gathering information regarding the position of the vehicle within the driving lane. For example, in one approach the lane keeping system may calculate a corrective steering torque that is a function of error between a target lane keeping position and an estimated position of the vehicle within the driving lane. The corrective steering torque is superimposed with a steering assist torque that is provided to a handwheel.

The current approach of calculating the corrective steering torque may have several limitations. For example, the application of the corrective steering torque may result in either an under-correction or an over-correction of the handwheel, depending on the amount of torque the driver is applying to the handwheel and the steering assist torque. Thus, a sensor or command switch may be provided for detecting whether a driver's hands are present on the handwheel. However, drivers tend to have varying grip levels on the handwheel.

Another limitation is that there are challenges in determining the appropriate limit of the corrective steering torque that may be applied to the handwheel. For example, if the corrective steering torque is applied to an input of an assist algorithm, then performance variations may occur. If the corrective steering torque is applied to an output of an assist algorithm, then variation in the handwheel torque may be less predictable. As a result, the corrective steering torque limits may be exceeded. Also, the constant application of the corrective steering torque may negatively impact the overall steering feel of the handwheel. This is because the corrective steering torque is generally applied even as a driver is steering through maneuvers.

SUMMARY OF THE INVENTION

In one embodiment, a control system for providing an assist torque is provided. The control system includes a control algorithm module and a comfort limit module. The control algorithm module calculates a corrective steering torque based on a target vehicle state and an estimated vehicle state. The comfort limit module receives a handwheel torque. The comfort limit module calculates a limited corrective steering torque based on the corrective steering torque and the handwheel torque. The limited steering torque represents an allowable amount of the assist torque provided by the control system.

In another embodiment, a control system for providing an assist torque is provided. The control system includes a control algorithm module and a coordination limit module. The control algorithm module calculates a corrective steering torque based on a target vehicle state and an estimated vehicle state. The coordination limit module determines a coordination torque that represents a higher value of one of the corrective steering torque and a steering assist torque with respect to a direction of the limited corrective steering torque.

In yet another embodiment, a control system for providing an assist torque is provided. The control system includes a control algorithm module, a comfort limit module and a coordination limit module. The control algorithm module calculates a corrective steering torque based on a target vehicle state and an estimated vehicle state. The comfort limit module receives a handwheel torque. The comfort limit module calculates a limited corrective steering torque based on the corrective steering torque and the handwheel torque. The limited steering torque represents an allowable amount of the assist torque provided by the control system. The coordination limit module determines a coordination torque. The coordination torque represents a higher value of one of the limited corrective steering torque and a steering assist torque with respect to a direction of the limited corrective steering torque.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
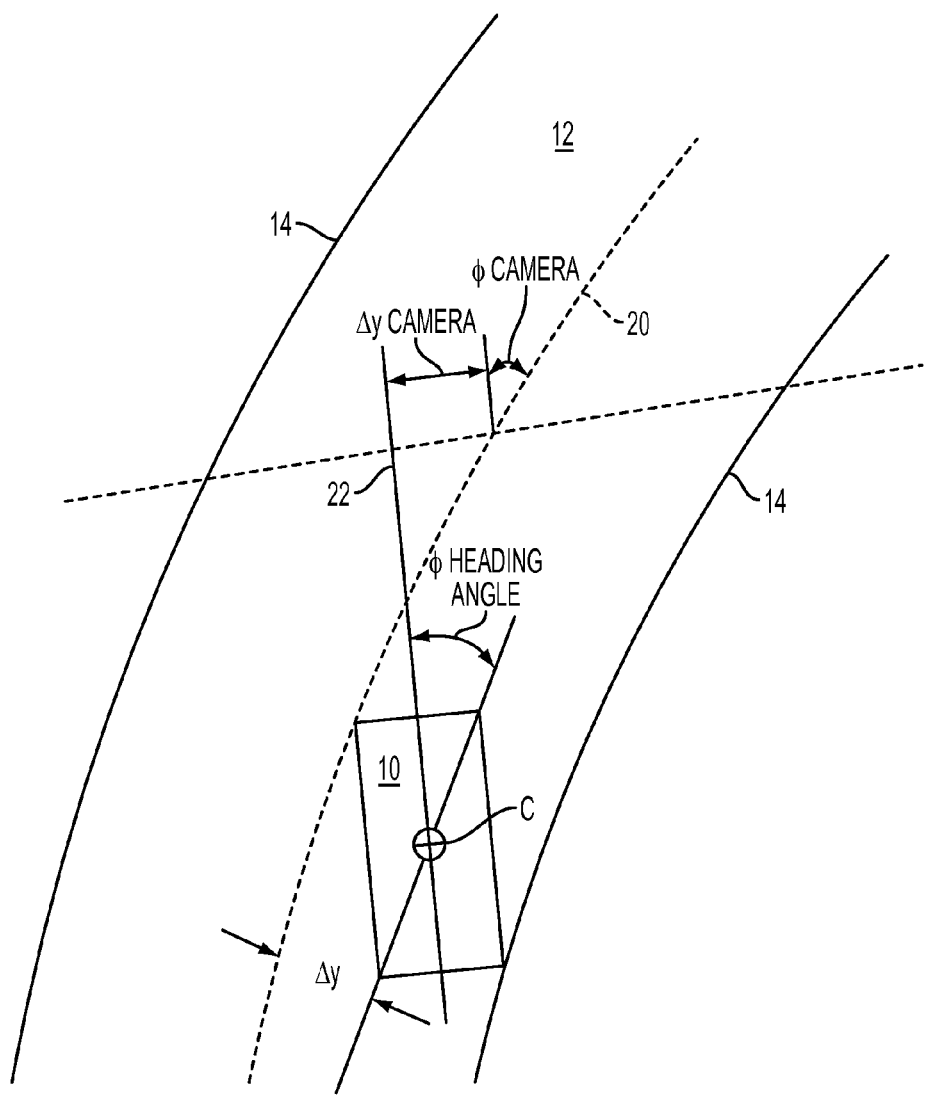
FIG. 1 is a diagram depicting a vehicle in a lane with lane markers.

Referring now to FIG. 1, where the invention will be described with reference to specific embodiments without limiting same, an exemplary schematic diagram of a vehicle 10 is shown. The vehicle 10 is driving within a lane 12. The lane 12 includes lane markers 14 on the left and right hand sides of the lane 12. The lane 12 includes a lane center 20 (the lane center is a calculated value, as there is no lane marker for the lane center 20) and the vehicle 10 includes a vehicle centerline 22. A lateral position Δy of the vehicle 10 illustrates an offset between the lane center 20 and a center of gravity C of the vehicle 10 with respect to the lane 12. A heading angle Φ is measured between the vehicle centerline 22 and a lane centerline nearest to the center of gravity C.

Figure 2:
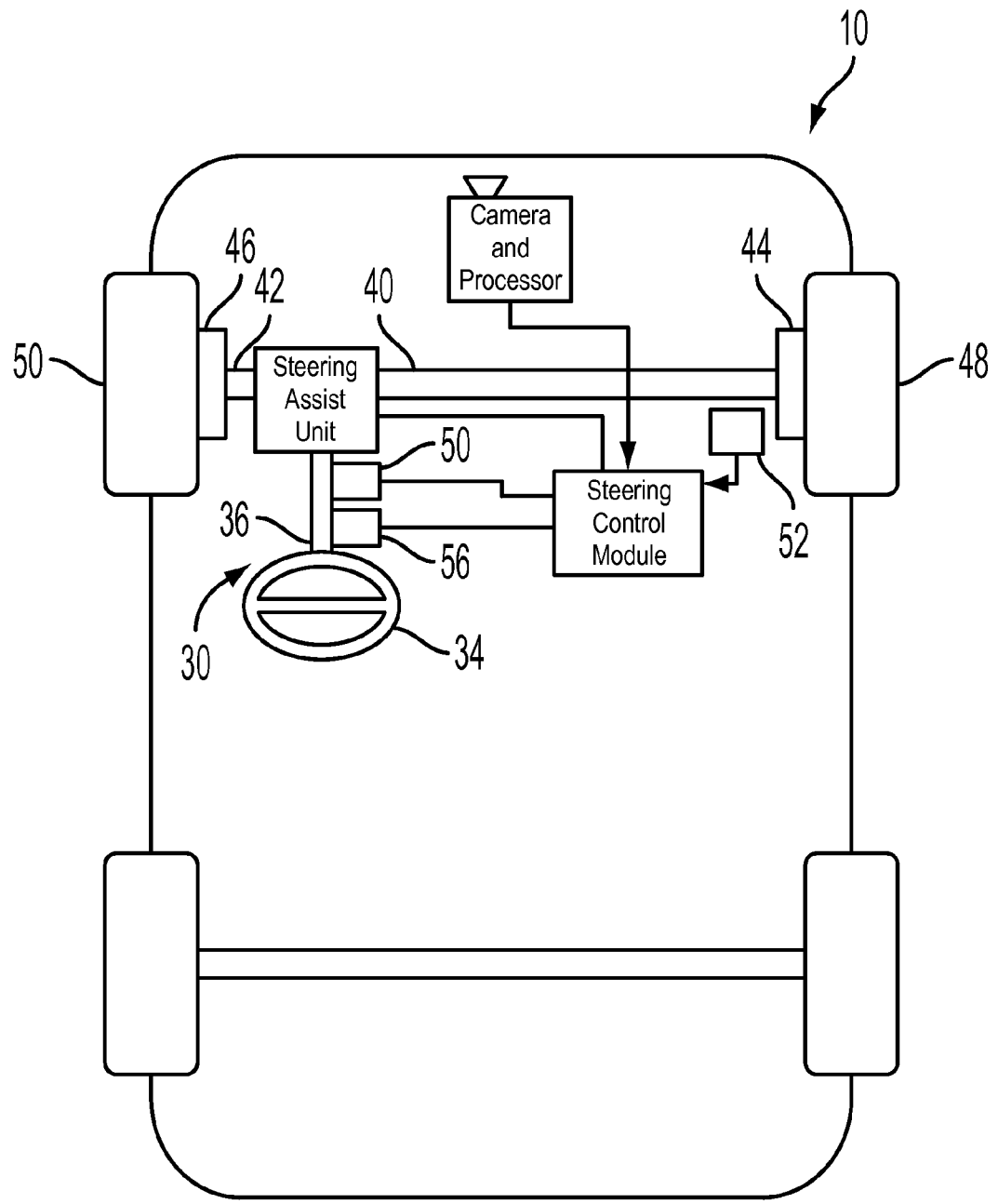
FIG. 2 is a schematic diagram of the vehicle in FIG. 1 having an exemplary system for providing an assist torque.

Turning now to FIG. 2, the vehicle 10 includes a steering system 30. The steering system 30 includes a handwheel 34 coupled to a steering shaft 36. The steering system 30 is an electric power steering (EPS) system that further includes a steering assist unit 38 that couples to the steering shaft 36 of the steering system 30 and to tie rods 40, 42 of the vehicle 10. The steering assist unit 38 includes, for example, a rack and pinion steering mechanism (not shown) that may be coupled through the steering shaft 36 to a steering actuator motor and gearing. During operation, as the handwheel 34 is turned by a vehicle operator, the motor of the steering assist unit 38 provides the assistance to move the tie rods 40, 42 which in turn moves steering knuckles 44, 46, respectively, coupled to roadway wheels 48, 50, respectively of the vehicle 10.

As shown in FIG. 2, the vehicle 10 further includes various sensors that detect and measure observable conditions of the steering system 30 and/or of the vehicle 10. In one example, a torque sensor 50, a vehicle speed sensor 52, and a steering angle sensor 56 are provided. A steering control module 60 controls the operation of the steering system 30 based on one or more of the signals from the sensors and as well as other system that are included in the vehicle 10. In the exemplary embodiment as shown in FIG. 2, an integrated camera and processor 62 are illustrated. In one embodiment, the camera and processor 62 may be part of a lane keeping system. The lane keeping system generates feedback for a corrective input into the handwheel 34 in the event a path deviation with respect to the lane markers 14 (shown in FIG. 1) is detected. The camera and processor 62 may calculate a relative lateral position $\Delta y_{camera}$ of the vehicle 10 (shown in FIG. 1) and a forward estimated heading angle $\Phi_{camera}$ of the vehicle 10 (shown in FIG. 1) with respect to the lane 12 based on the lane markers 14 that are detected by the camera. The camera and processor 62 is in communication with the steering control module 60. The steering control module 60 receives the relative lateral position $\Delta y_{camera}$ and the forward estimated heading angle $\Phi_{camera}$ as inputs.

It should be noted that while the camera and processor 62 that are part of the lane keeping system are discussed, other approaches may be used as well to determine the relative lateral position $\Delta y_{camera}$ and the forward estimated heading angle $\Phi_{camera}$ (e.g., sensors such as accelerometers). It should also be noted that while the camera and processor 62 are illustrated as part of a lane keeping system, the camera and processor 62 may also be used with other types of vehicle response control systems such as, for example, a stability control system.

Figure 3:
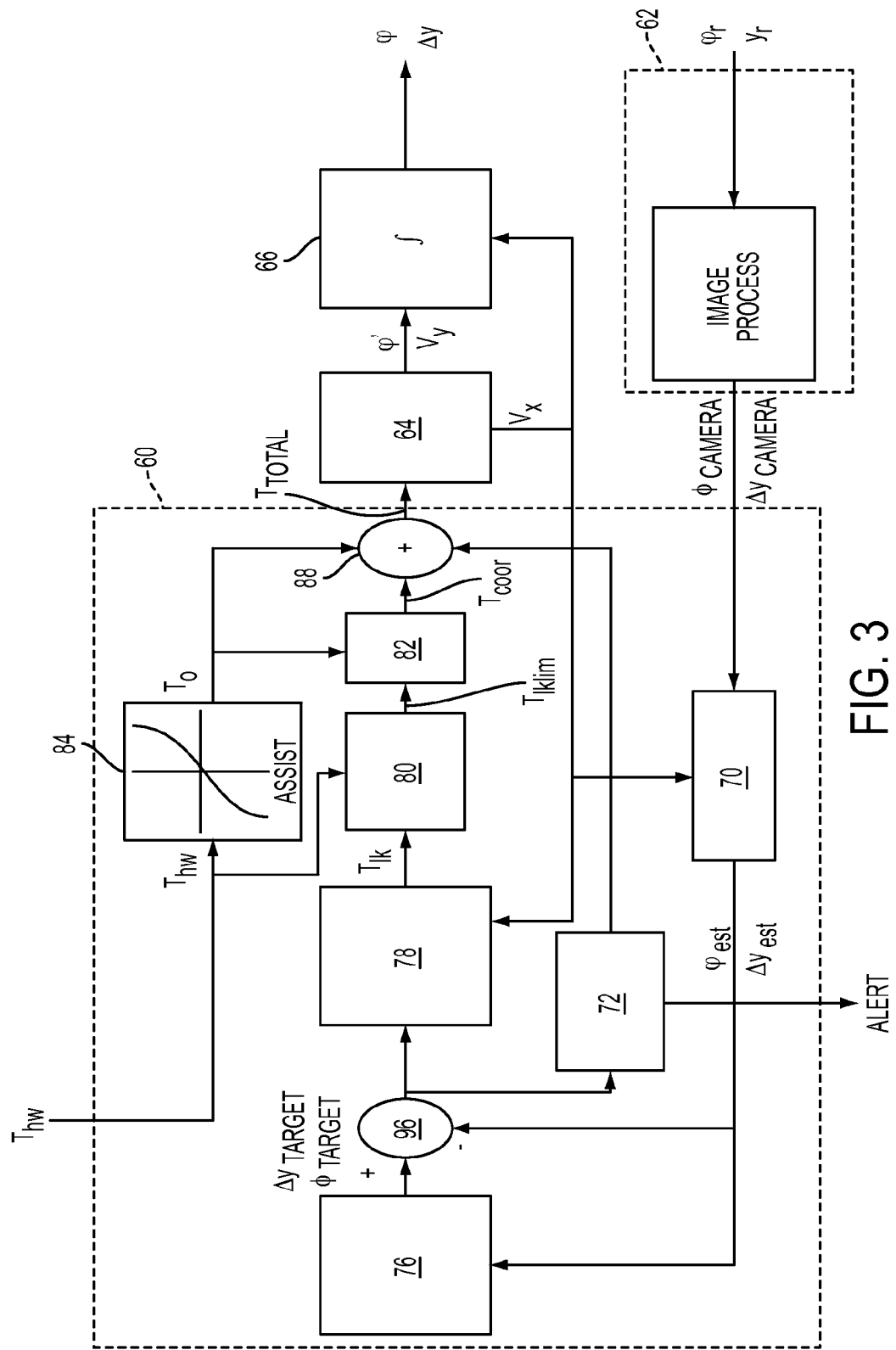
FIG. 3 is a block diagram illustrating a steering control module shown in FIG. 2.

FIG. 3 is an exemplary block diagram of an approach of coordinating a steering assist torque with a driver input to the handwheel 34 (shown in FIG. 2). FIG. 3 illustrates the steering control module 60 in communication with the camera and processor 62. The camera and processor 62 detects the position of the lane markers 14 (illustrated in FIG. 1), and determines the relative lateral position $\Delta y_{camera}$ based the position of the markers $y_r$. The relative lateral position $\Delta y_{camera}$ may be estimated at a viewing distance of the camera, which may range from about 6 to about 30 meters ahead of the vehicle 10. In one embodiment, the camera and processor 62 may include processing 70 to estimate the relative lateral position $\Delta y_{est}$ at a center of gravity of the vehicle 10. The camera and processor 62 also includes control logic for determining the forward estimated heading angle $\Delta_{camera}$ camera with reference to the heading angle of the lane $\Phi_r$. The forward estimated heading angle $\Delta_{camera}$ camera may also be estimated at the viewing distance of the camera, which ranges from about 6 to about 30 meters ahead of the vehicle 10. In one embodiment, the camera and processor 62 may also include processing 70 to estimate the forward estimated heading angle $\Phi_{est}$ at the center of gravity of the vehicle 10.

FIG. 3 also illustrates a vehicle represented by blocks 64 and 66. Block 64 represents the yaw rate $\Phi'$ and lateral velocity $v_y$ behavior of the vehicle 10 in response to steering inputs and external forces. Some examples of external forces include, but are not limited to, wind and road surface. The longitudinal speed $v_x$ of the vehicle 10 is also considered an output of the vehicle model and considered available to the steering control module 60. Block 66 represents the coordinate transformation between vehicle coordinates and global coordinates to determine the heading angle $\Phi$ and the lateral position $\Delta y$ of the vehicle in global coordinates.

Continuing to refer to FIG. 3, a dataflow diagram illustrates an exemplary embodiment of the steering control module 60 of FIG. 2 used to control the steering system 30 of FIG. 2. In various embodiments, the steering control module 60 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 3 can be combined and/or further partitioned. Inputs to the control module 60 may be generated from the camera and processor 62, may be received from other control modules (not shown), modeled, or predefined.

In the exemplary embodiment as shown, the steering control module 60 includes an estimation module 70, an alert module 72, a lane driving assistance module 76, a control algorithm module 78, a comfort limit module 80, a coordination limit module 82, an assist module 84 and a summing junction 88. However, it is understood that some of the various modules of the steering control module 60 may be omitted, or other modules added in various embodiments. In addition to the forward estimated heading angle $\Phi_{camera}$ and the relative lateral position $\Delta y_{camera}$, a driver generated handwheel torque $T_{hw}$ is also an input to the steering control module 60.

The handwheel torque $T_{hw}$ represents the command generated by a driver to control the vehicle response. One component of the handwheel torque $T_{hw}$ represents the amount of torque that a driver would apply to the handwheel 34 (FIG. 2) when reacting to the vehicle response relative to the lane. However, the driver may also produce handwheel torque $T_{hw}$ that is not related to the vehicle response relative to the lane. These include, but are not limited to, driving around obstacles, lane changes and making exits and turns.

The estimation module 70 may perform signal conditioning and coordinate frame transformation that may be needed for relatively effective vehicle control. In the embodiment as shown, the estimation module 70 estimates the vehicle state at its center of gravity based on the forward estimated heading angle $\Phi_{camera}$, the relative lateral position $\Delta y_{camera}$, and other vehicle parameters such as, for example, speed of the vehicle 10 (FIG. 2) as well as the steering angle of the handwheel 34 (FIG. 2). Specifically, the estimation module 70 may determine at least an estimated heading angle $\Phi_{est}$ of the vehicle 10 and an estimated lateral position $\Delta y_{est}$ of the vehicle 10. The estimated heading angle $\Phi_{est}$ and the estimated lateral position $\Delta y_{est}$ are with reference to the lane 12 (shown in FIG. 1).

The lane driving assistance module 76 receives as input the vehicle state from the estimation module 70. Specifically, in the embodiment as shown, the lane driving assistance module 70 receives the estimated heading angle $\Phi_{est}$ of the vehicle 10 and the estimated lateral position $\Delta y_{est}$ of the vehicle 10. The lane driving assistance module 76 determines a target vehicle state (e.g., a target heading angle $\Phi_{target}$ and a target lateral position $\Delta y_{target}$) of the vehicle 10 with reference to the lane markers 14 (shown in FIG. 1). Additional signals such as yaw rate, heading angle $\Phi$, or lateral acceleration may also be utilized by the lane driving assist module 76 for determining a target vehicle speed as well.

A junction 96 is provided that receives the output from the estimation module 70 and the lane driving assistance module 76. The junction 96 is in communication with the alert module 72 and the control algorithm module 78. The junction 96 determines an error between target vehicle state from the lane driving assistance module 76 (the target heading angle $\Phi_{target}$ and a target lateral position $\Delta y_{target}$) and the estimated vehicle state from the estimation module 70 (forward estimated heading angle $\Phi_{est}$ and estimated lateral position $\Delta y_{est}$). In one embodiment, if the error between the target vehicle state and the estimated vehicle state exceeds a threshold value, the alert module 72 may activate a warning. The warning may be, for example, a visual indicator that provides a message on a vehicle display (not illustrated), or flashing lights. Alternatively, in another example, the warning may be a haptic indicator such as, for example, vibrations in a driver's seat (not illustrated). In yet another example, the alert module 72 may also generate an optional steering command (e.g., via the summing junction 88) to alert a driver that a lane departure threshold of the lane keeping system has been reached. The steering commands may be, for example, a torque vibration or a nudging torque pulse to the handwheel 34.

The control algorithm module 78 receives as input the error between target vehicle state from the lane driving assistance module 76 and the estimated vehicle state from the estimation module 70, and determines a corrective steering torque $T_{lk}$ based on the error. The corrective steering torque $T_{lk}$ represents the amount of torque that is provided by the lane keeping system in the event a path deviation with respect to the lane markers 14 (shown in FIG. 1) is detected.

The comfort limit module 80 receives as inputs the corrective steering torque $T_{lk}$ from the control algorithm module 78 and the handwheel torque $T_{hw}$ that is exerted on the handwheel 34 (FIG. 2), and determines a limited corrective steering torque $T_{lklim}$. The limited corrective steering torque $T_{lklim}$ represents a comfort limit of the amount of assist torque that may be provided to the handwheel 34 by the lane keeping system. The comfort limit represents the allowable amount of assist torque that may appropriately be provided to the handwheel 34 during a corrective action executed by the lane keeping system. In one example, the corrective action by the lane keeping system is the steering assist torque provided by the lane keeping system to keep the vehicle 10 within the lane markers 14 as shown in FIG. 1.

Figure 4:
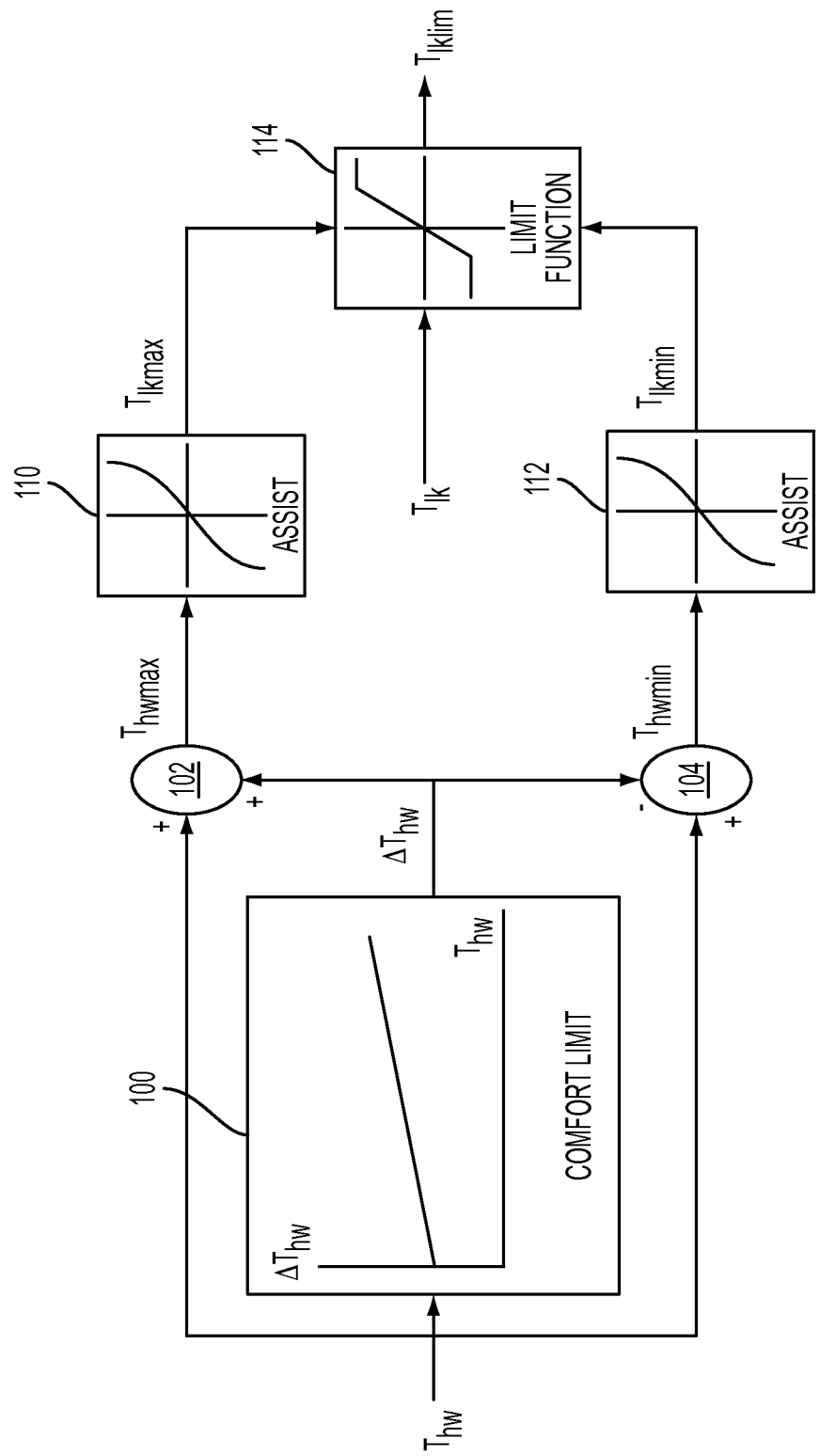
FIG. 4 is an exemplary illustration of an approach for determining a limited corrective steering torque according to one aspect of the invention.

Turning now to FIG. 4, an exemplary approach of calculating the limited corrective steering torque $T_{lklim}$ is illustrated. In the embodiment as shown, the handwheel torque $T_{hw}$ is inputted into a table 100. The table 100 uses as input the handwheel torque $T_{hw}$, and determines an allowable handwheel torque deviation $\Delta T_{hw}$. In one approach, the allowable handwheel torque deviation $\Delta T_{hw}$ may be based on the handwheel torque $T_{hw}$. The allowable handwheel torque deviation $\Delta T_{hw}$ may also be based on other factors as well such as, for example, vehicle speed, lateral acceleration, or a combination of both. In another embodiment, a predetermined value for the allowable handwheel torque deviation $\Delta T_{hw}$ may be used instead. For example, in one approach, the allowable handwheel torque deviation $\Delta T_{hw}$ may include a range of about +/−3 N/m The allowable handwheel torque deviation $\Delta T_{hw}$ is sent to a summing junction 102 and another junction 104. The summing junction 102 adds the allowable handwheel torque deviation $\Delta T_{hw}$ and the handwheel torque $T_{hw}$ to obtain an upper limit for handwheel torque $T_{hwmax}$. The junction 104 subtracts the allowable handwheel torque deviation $\Delta T_{hw}$ from the handwheel torque $T_{hw}$ to obtain a lower limit for handwheel torque $T_{hwmin}$. The upper limit for handwheel torque $T_{hwmax}$ is sent to a lookup table 110. The lookup table 110 determines an upper limit for corrective steering torque $Tl_{kmax}$. The upper limit for corrective steering torque $T_{lkmax}$ represents the upper limit or maximum amount of assist torque that may be applied to the handwheel 34 (shown in FIG. 2) by the lane keeping system. The lower limit for handwheel torque $T_{hwmin}$ is also sent to a lookup table 112. The lookup table 112 determines a lower limit for corrective steering torque $T_{lkmin}$. The lower limit for corrective steering torque $T_{lkmin}$ represents the lower limit or the least amount of assist torque that may be applied to the handwheel 34 by the lane keeping system. The lookup tables 110 and 112 may be replicas of actual assist tables stored in the assist module 84 (FIG. 3). The assist module 84 receives as input the handwheel torque $T_{hw}$ exerted by the driver, which represents the basic electric power steering control, of which static assist is an important component. The assist module 84 determines a steering assist torque $T_o$. The steering assist torque $T_o$ represents an amount of assist torque generated in response to the handwheel torque $T_{hw}$ exerted by the driver. The steering assist torque $T_o$ is also an input to the coordination limit module 82.

The upper limit for corrective steering torque $T_{lkmax}$, the lower limit for handwheel torque $T_{hwmin}$, and the corrective steering torque $T_{lk}$ from the control algorithm module 78 are inputted into a limit function 114, which uses saturation values of the lower limit for handwheel torque $T_{hwmin}$ (for the minimum) and the upper limit for corrective steering torque $Tl_{kmax}$ (for the maximum). The limit function 114 outputs the limited corrective steering torque $T_{lklim}$. The limited corrective steering torque $T_{lklim}$ is a corrective steering torque value that does not exceed the upper limit for corrective steering torque $T_{lkmax}$ and is not less than the lower limit for corrective steering torque $T_{lkmin}$. The approach as illustrated in FIG. 4 ensures the broadest range of command is available for the corrective steering torque $T_{lkmin}$.

Turning back to FIG. 3, the limited corrective steering torque $T_{lklim}$ is sent to the coordination limit module 82. Although FIG. 3 illustrates the corrective steering torque $T_{lklim}$ being inputted into the coordination limit module 82, it is to be understood that in various embodiments the comfort limit module 80 may be omitted, and the coordination limit module 82 receives as input the corrective steering torque $T_{lk}$ from the control algorithm module 78 instead.

The coordination limit module 82 determines a coordination torque $T_{coor}$ that represents a suitable value when both the driver and the lane keeping control algorithm are simultaneously active. The coordination torque $T_{coor}$ represents a higher value of either the limited corrective steering torque $T_{lklim}$ or the steering assist torque $T_o$, with respect to a direction or sign of the limited corrective steering torque $T_{lklim}$. In one embodiment, the coordination torque $T_{coor}$ may be expressed by the following equation:

$$T_{coor} = \text{sign}(Tlk_{lim}) * \max(\text{sign}(Tlk_{lim}) * T_o, |Tlk|) * \text{sign}(Tlk_{lim}) - T_o$$

where the sign of the limited corrective steering torque $T_{lklim}$ may be expressed as $\text{sign}(Tlk_{lim}) = 1$ for $Tlk_{lim} \geq 0$, and sign $(Tlk_{lim}) = -1$ for $(Tlk_{lim}) < 0$. It should be noted that in various embodiments, the limited corrective steering torque $T_{lklim}$ may be replaced with the corrective steering torque $T_{lk}$ from the control algorithm module 78. It should also be noted that if there are discontinuities in the coordination torque $T_{coor}$, a slew rate limiter or a low pass filter be provided to smoothen the inputs or outputs to the coordination limit module 82 in order to provide continuity to the coordination torque $T_{coor}$.

The coordination torque $T_{coor}$ adjusts for driver input (e.g., the steering assist torque $T_o$) to the handwheel 34. Therefore, the lane keeping system (or other type of vehicle response control system) does not generally overcorrect and apply an excessive amount of assist torque to the handwheel 34 if a driver is already exerting the handwheel torque $T_{hw}$ on the handwheel 34. The coordination torque $T_{coor}$ and the steering assist torque $T_o$ are both sent to the summing junction 88 to determine a total amount of torque $T_{total}$ that is exerted on the handwheel 34. Note that other steering functions and blocks normally present in the power steering system are not shown here for simplicity. These may include functions such as friction compensation, stability compensator, damping control, motor control, etc.

Figure 5A:
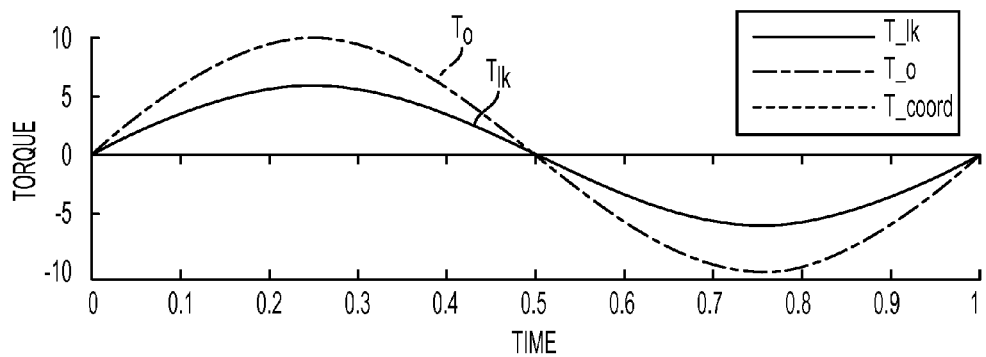
FIGS. 5A-5D are exemplary graphs illustrating various operating conditions of the vehicle according to another aspect of the invention.
Figure 5B:
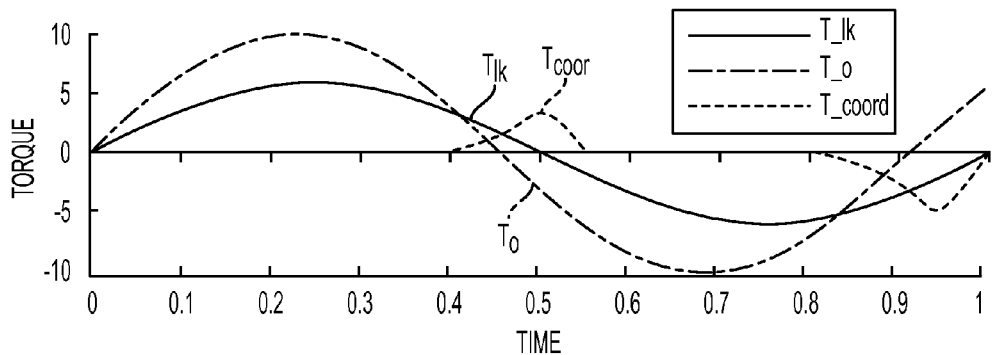
Figure 5C:
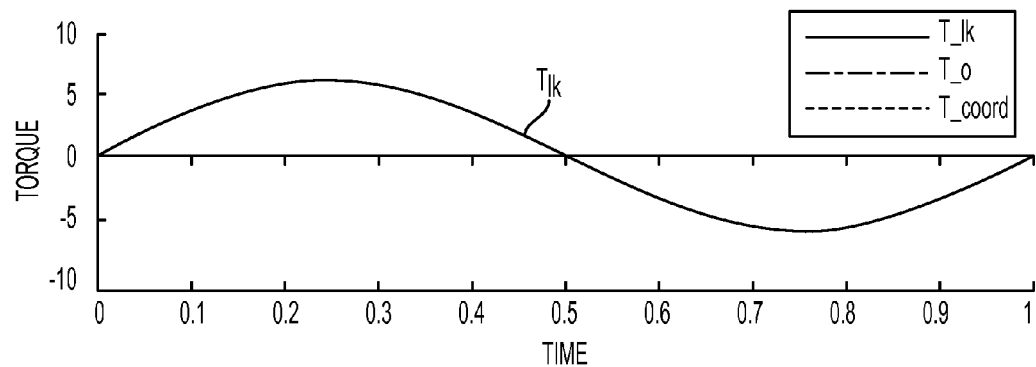
Figure 5D:
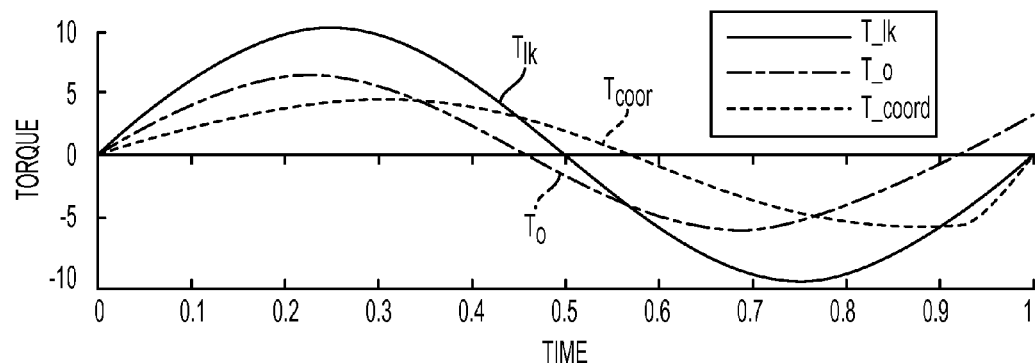

FIGS. 5A-5D illustrate some examples of the coordination torque $T_{coor}$ during operation of the steering system 30 (shown in FIG. 2). FIG. 5A is an illustration of an operating condition where a driver exerts a torque (represented by the steering assist torque $T_o$) that is greater than the amount of assist torque (represented by the corrective steering torque $T_{lk}$) that would be provided by the lane keeping system. Thus, because a driver has already provided more torque to the handwheel 34 (FIG. 2) than what is required, the coordination torque $T_{coor}$ is not provided. FIG. 5B is an illustration of an operating condition where a driver does not occasionally provide the required handwheel torque required to keep the vehicle 10 within the lane 12 (FIG. 1). In this illustration, the coordination torque $T_{coor}$ is only provided if the steering assist torque $T_o$ exerted by the driver does not exceed the amount of assist torque that would be provided by the lane keeping system. FIG. 5C is an illustration of an operating condition where a driver does not exert a handwheel torque (e.g., a hands-off driving condition). In this case, the corrective steering torque $T_{lk}$ is always provided to the handwheel 34. FIG. 5D is an illustration of an operating condition where a driver exerts only a portion of the torque needed to keep the vehicle 10 within the lane 12 (FIG. 1). In this case, the coordination torque $T_{coor}$ is provided to provide the difference between the steering assist torque $T_o$ and the corrective steering torque $T_{lk}$.

The system as described in FIGS. 1-5D provides the appropriate amount of assist torque (the limited corrective steering torque $T_{lklim}$) to the handwheel 34 during a corrective action executed by the lane keeping system. Thus, unlike some steering systems that are currently available, the steering system 30 as described above generally provides the appropriate amount of corrective steering torque that may be applied to the handwheel 34. Moreover, the coordination torque $T_{coor}$ is provided such that the lane keeping system does not generally provide more torque than required in the event a driver also exerts the handwheel torque $T_{hw}$.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for providing an assist torque, comprising:
   a control algorithm module configured to calculate a corrective steering torque based on a target vehicle state and an estimated vehicle state, the corrective steering torque for causing a vehicle to reach the target vehicle state; and
   a coordination limit module configured to:
      compare the corrective steering torque and a steering assist torque to determine whether the steering assist torque is sufficient to cause the vehicle to reach the target vehicle state: and
      generate a coordination torque to combine with the steering assist torque when the steering assist torque is insufficient to bring the vehicle to reach the target vehicle state, the coordination torque combined with the steering assist torque causing the vehicle to reach the target vehicle state.

2. The control system as recited in claim 1, further comprising a comfort limit module configured to:
   calculate a limited corrective steering torque based on the corrective steering torque and a handwheel torque, the limited steering torque representing an allowable amount of the assist torque provided by the control system; and
   determine an allowable handwheel torque deviation based on the handwheel torque.

3. The control system as recited in claim 2, wherein the allowable handwheel torque deviation is used to determine an upper limit for corrective steering torque and a lower limit for corrective steering torque, wherein the upper limit for corrective steering torque is calculated based on an upper limit assist table and the lower limit for corrective steering torque is calculated based on a lower limit assist table.

4. The control system as recited in claim 1, further comprising a lane driving assist module configured to determine the target vehicle state, and wherein the target vehicle state includes a target heading angle $\Phi_{target}$, and a target lateral position $\Delta_{ytarget}$.

5. The control system as recited in claim 1, further comprising an estimation module configured to calculate an estimated heading angle and a relative lateral position, wherein the estimated heading angle and the relative lateral position of the vehicle are based on the position of the vehicle with respect to the lane.

6. The control system as recited in claim 5, comprising a lane keeping system including a camera and processor in communication with the estimation module.

7. The control system as recited in claim 1, further comprising a filter configured to eliminate any discontinuity in the coordination torque.

8. A control system for providing an assist torque, comprising:
   a control algorithm module configured to calculate a corrective steering torque based on a target vehicle state and an estimated vehicle state;
   a comfort limit module configured to receive a handwheel torque and calculate a limited corrective steering torque based on the corrective steering torque and the handwheel torque, the limited steering torque representing an allowable amount of the assist torque provided by the control system; and
   a coordination limit module configured to determine a coordination torque and cause a vehicle to reach the target vehicle state by sending the coordination torque to the vehicle, wherein the coordination torque represents a higher value of one of the limited corrective steering torque and a steering assist torque with respect to a direction of the limited corrective steering torque, wherein the coordination torque is expressed by the following equation:

$$T_{coor} = \text{sign}(Tlk_{lim}) * \max(\text{sign}(Tlk_{lim}) * T_o, |Tlk|) * \text{sign}(Tlk_{lim}) - T_o$$

wherein $Tlk_{lim}$ is the limited corrective steering torque and To is the steering assist torque, and wherein $\text{sign}(Tlk_{lim})=1$ for $Tlk_{lim}\geq 0$; $-1$ for $Tlk_{lim}<0$.

9. The control system as recited in claim 8, wherein a total amount of torque is determined by summing the steering assist torque and the coordination torque together.

10. A control system for providing an assist torque, comprising:
a control algorithm module configured to calculate a corrective steering torque based on a target vehicle state and an estimated vehicle state; and
a coordination limit module configured to determine a coordination torque that represents a higher value of the corrective steering torque and a steering assist torque with respect to a direction of the limited corrective steering torque and cause a vehicle to reach the target vehicle state by sending the coordination torque to the vehicle.

11. The control system as recited in claim 10, wherein a total amount of torque is determined by summing the steering assist torque and the coordination torque together.

12. The control system as recited in claim 10, further comprising an estimation module configured to calculate an estimated heading angle and a relative lateral position of the vehicle, wherein the estimated heading angle and the relative lateral position of the vehicle are based on the position of the vehicle with respect to the lane.

13. The control system as recited in claim 12, further comprising a lane keeping system including a camera and processor in communication with the estimation module.

14. The control system as recited in claim 10, further comprising a comfort limit module configured to calculate a limited corrective steering torque based on the corrective steering torque and a handwheel torque, the limited steering torque representing an allowable amount of the corrective steering torque provided by the control system.

15. The control system as recited in claim 14, wherein the comfort limit module is configured to determine an allowable handwheel torque deviation based on the handwheel torque.

16. The control system as recited in claim 15, wherein the allowable handwheel torque deviation is used to determine an upper limit for corrective steering torque and a lower limit for corrective steering torque, wherein the upper limit for corrective steering torque is calculated based on an upper limit assist table and the lower limit for corrective steering torque is calculated based on a lower limit assist table.

17. The control system as recited in claim 10, further comprising a lane driving assist module configured to determine the target vehicle state, and wherein the target vehicle state includes a target heading angle $\Phi_{target}$ and a target lateral position $\Delta_{ytarget}$.

18. A control system for providing an assist torque, comprising:
a control algorithm module configured to calculate a corrective steering torque based on a target vehicle state and an estimated vehicle state; and
a coordination limit module configured to receive a steering assist torque, determine a coordination torque that represents a higher value of one of the corrective steering torque and the steering assist torque with respect to a direction of the limited corrective steering torque and cause a vehicle to reach the target vehicle state by sending the coordination torque to the vehicle, wherein the coordination torque is expressed by the following equation:

$$T_{coor}=\text{sign}(Tlk)*\max(\text{sign}(Tlk)*To,Tlk)*\text{sign}(Tlk)-To$$

wherein Tlk is the corrective steering torque and To is the steering assist torque, and wherein $\text{sign}(Tlk)=1$ for $Tlk\geq 0$; $-1$ for $Tlk<0$.

19. A control system for providing an assist torque, comprising:
a control algorithm module configured to calculate a corrective steering torque based on a target vehicle state and an estimated vehicle state;
a comfort limit module configured to calculate a limited corrective steering torque based on the corrective steering torque and a handwheel torque, the limited steering torque representing an allowable amount of the corrective steering torque provided by the control system; and
a coordination limit module configured to determine a coordination torque, wherein the coordination torque represents a higher value of the limited corrective steering torque and a steering assist torque with respect to a direction of the limited corrective steering torque and cause a vehicle to reach the target vehicle state by sending the coordination torque to the vehicle.

20. A control system for providing an assist torque, comprising:
a control algorithm module configured to calculate a corrective steering torque based on a target vehicle state and an estimated vehicle state;
a comfort limit module configured to receive a handwheel torque and calculate a limited corrective steering torque based on the corrective steering torque and the handwheel torque, the limited steering torque representing an allowable amount of the corrective steering torque provided by the control system; and
a coordination limit module configured to receive a steering assist torque, determine a coordination torque and cause a vehicle to reach the target vehicle state by sending the coordination torque to the vehicle, wherein the coordination torque represents a higher value of one of the limited corrective steering torque and the steering assist torque with respect to a direction of the limited corrective steering torque, wherein the coordination torque is expressed by the following equation:

$$T_{coor}=\text{sign}(Tlk_{lim})*\max(\text{sign}(Tlk_{lim})*T_o,|Tlk|)*\text{sign}(Tlk_{lim})-T_o$$

wherein $Tlk_{lim}$ is the limited corrective steering torque and $T_o$ is the steering assist torque, and wherein $\text{sign}(Tlk_{lim})=1$ for $Tlk_{lim}\geq 0$; $-1$ for $(Tlk_{lim})<0$.

* * * * *